United States Patent
Tseng et al.

(10) Patent No.: US 7,425,947 B1
(45) Date of Patent: Sep. 16, 2008

(54) DUAL SIDED INPUT DEVICE FOR A HANDHELD COMPUTER

(75) Inventors: Grace Tseng, Palo Alto, CA (US); Zita Netzel, Cupertino, CA (US); Mike Ryner, Brentwood, CA (US); Dipti Vaghela, Santa Clara, CA (US); Mark Babella, Salida, CA (US); Bill Webb, Redwood City, CA (US)

(73) Assignee: PalmSource, Inc., Sunnyvale, CA (US)

( * ) Notice: Subject to any disclaimer, the term of this patent is extended or adjusted under 35 U.S.C. 154(b) by 150 days.

(21) Appl. No.: 10/444,159

(22) Filed: May 22, 2003
(Under 37 CFR 1.47)

(51) Int. Cl.
*G06F 3/02* (2006.01)

(52) U.S. Cl. .................... 345/169; 345/156

(58) Field of Classification Search ......... 345/156–179, 345/901, 905, 95; 348/14.02, 373–376; 455/556.1, 455/566, 550.1, 556.2, 557, 556, 575.1–575.4
See application file for complete search history.

(56) References Cited

U.S. PATENT DOCUMENTS

| | | | |
|---|---|---|---|
| 6,580,932 B1 * | 6/2003 | Finke-Anlauff | 455/566 |
| 6,788,285 B2 * | 9/2004 | Paolucci et al. | 345/156 |
| 6,952,601 B2 * | 10/2005 | Lieu et al. | 455/566 |
| 2003/0210224 A1 * | 11/2003 | Bartholomew et al. | 345/156 |
| 2004/0160511 A1 * | 8/2004 | Boesen | 348/14.02 |
| 2004/0196265 A1 * | 10/2004 | Nohr | 345/169 |
| 2004/0198416 A1 * | 10/2004 | Gardner et al. | 455/556.1 |

* cited by examiner

*Primary Examiner*—David L. Lewis
(74) *Attorney, Agent, or Firm*—Berry & Associates P.C.

(57) ABSTRACT

A handheld computer assembly for integrating an input device with a handheld computing device is disclosed. In one embodiment, the present invention is comprised of a handheld computer comprising: an integrated display screen; and an expansion slot. In addition, an input device for coupling to the handheld computer via connection with the expansion slot is communicatively coupled with the handheld computer. The input device comprises a first portion comprising keys and a second portion comprising cursor navigation implements and wherein the first portion and the second portion are disposed on opposite ends of the input device. The input device utilizes the expansion slot to provide the communicatively coupled connection with the handheld computer.

10 Claims, 5 Drawing Sheets

DUAL SIDED INPUT DEVICE FOR A HANDHELD COMPUTER

TECHNICAL FIELD

The present claimed invention relates to the field of handheld computers. More specifically, the present claimed invention relates to a dual sided input device for a handheld computer.

BACKGROUND ART

Presently, portable, e.g., handheld computing devices are utilized for a plurality of applications. Specifically, they may be used as personal digital assistants (PDAs), date books, calendars, planners, notepads, alarm clocks, gaming devices, or the like. Furthermore, they may be used to send, write, and/or receive e-mail, electronic files, documents, pictures, etc. Handheld computing devices may be used to store both personal and business information. In the present electronic environment, the surface has barely been scratched with regard to the many possible uses of handheld computing devices.

In general, information is entered into a handheld computing device in a variety of ways. For example, the handheld computing device may be linked to another computing device, or a stylus may be utilized in conjunction with recognition software to allow a user to write directly to the handheld computing device.

The fastest way to enter information into a handheld computing device may be the utilization of a link between two or more computing devices. For example, a user may have a docking station (e.g., Cradle, Universal Serial Bus (USB) connection, infrared, Bluetooth, etc.) which electronically couples their handheld computing device to a larger, more powerful, and less mobile computing device. This type of connection allows for an extremely efficient way to upload, download, and/or transfer data.

A slower method for entering information is the stylus. Basically, a stylus is utilized in conjunction with recognition software to allow a user to "write" directly to the handheld computing device. It is a slow process that may require the user to write with a very specific style. For example, a user may need to exaggerate letters to ensure proper recognition. Moreover, the use of recognition software may require some tedious "training" in order for the software to correctly identify each individual writing style.

Due to the inefficient method of entering data into a handheld device by the stylus and recognition software, a third method for entering information (data, etc.) into a handheld computing device may be used. This third method is a plug-and-play keyboard or other input device (e.g., microphone, scanner, etc.) which may be attached to the handheld computing device. In general, the plug-and-play keyboard is a second device which is compact and folds out to provide a user with a keyboard similar in shape and size to a desktop keyboard.

Although, the data input capability of a plug-and-play type keyboard is much greater than that of the stylus and recognition software mentioned herein, utilizing a plug-and-play keyboard has many drawbacks. For example, a plug-and-play keyboard is a separate device that must also be transported with the handheld computing device. That means instead of one pocket (or belt device retainer) filled with computing hardware, two may now be filled with computing hardware.

Another, deleterious effect of plug-and-play keyboards is the forgotten, or loss factor. For example, if one wanted to input some information into a handheld computing device and the plug-and-play keyboard is forgotten or lost then the slower stylus method must be used. In a real time situation such as a meeting or phone call, this may result in the missing or omitting of important information. Furthermore, replacing a lost or stolen plug-and-play keyboard may be expensive.

DISCLOSURE OF THE INVENTION

The present invention provides, in various embodiments, a dual sided input device for a handheld computer method and apparatus which allows for easier data entry. The dual sided input device for a handheld computer method and apparatus also provides a compact and highly portable data input method which significantly reduces component costs and requirements. In addition, it can be adapted to readily interface with industry standard expansion slots and meet industry standard specifications.

More specifically, one embodiment of the present invention is directed to a computer system comprising: a handheld computer comprising: an integrated display screen; and an expansion slot; an input device for coupling to the handheld computer via connection with the expansion slot, wherein the input device comprises a first portion comprising keys and a second portion comprising cursor navigation implements and wherein the first portion and the second portion are disposed on opposite ends of the input device.

Embodiments also include the above and wherein the input device is rotatably attached to the handheld computer allowing the first portion and the second portion to be oriented with the integrated display screen by rotation of the input device with respect to the handheld computer. Embodiments include the above and wherein the rotation is performed about a long axis of the display screen and also wherein the rotation is performed about an axis that is parallel to a short axis of the display screen.

Embodiments include the above and wherein the display screen is oriented in a landscape display mode (or portrait display mode) and the input device is disposed underneath the display screen. Embodiments include the above and wherein the handheld computer is inoperable without the input device.

Embodiments also include the above and wherein the input device is removably attached to the handheld computer allowing the first portion and the second portion to be accessed by removal and replacement of the input device with respect to the handheld computer. Embodiments include the above (e.g., wherein the input device is removed, turned over, and reattached) and also wherein one input device is removed and a second input device (possibly having a different first portion and/or second portion) is attached.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

With reference now to FIGS. 1 through 6, perspective views of handheld computer assemblies are shown in accordance with embodiments of the present claimed invention. The following discussion will begin with a detailed description of the physical characteristics of the present handheld computer assemblies. The discussion will then contain a detailed description of the use and operation of the handheld computer assemblies.

Figure 1:
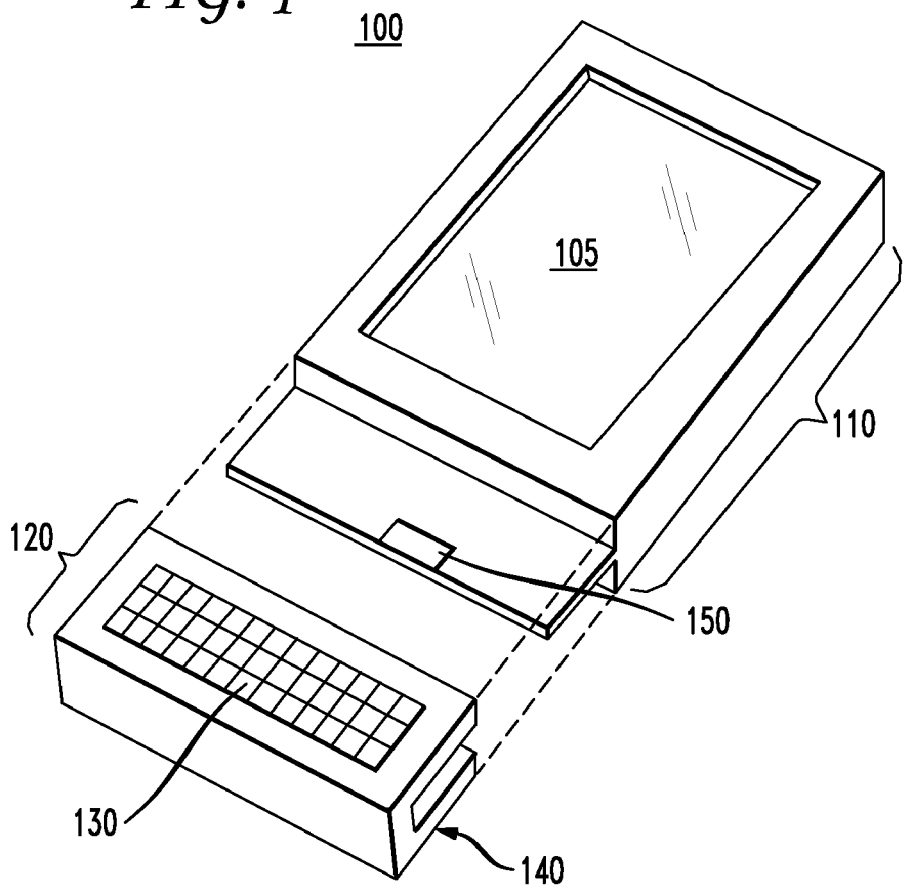
FIG. 1 is a perspective view of one embodiment of a handheld computer assembly having a removable input device in accordance with the present claimed invention.

Regarding the physical structure of the handheld computer assembly of FIG. 1, in one embodiment, handheld computing device 110 has an expansion slot 150. Moreover, an input device 120 is communicatively coupled with handheld computing device 110. Importantly, as will be discussed in detail below, input device 120 utilizes expansion slot 150 to provide the communicatively coupled connection with handheld computing device 110.

In one embodiment, input device 120 may be designed to have a keypad portion 130 coupled to one side and an application/navigation (app/nav) portion 140 coupled to the obverse. In one embodiment, the device 120 is removable. Although two specific input sides are mentioned herein, the input sides utilized on input device 120 may be selected from the plurality of possible input devices such as a thumb keypad, keyboard, thumb keyboard, joystick, touch screen, virtual screen, or the like.

Referring still to FIG. 1, expansion slot 150 may be any of a plurality of slot options such as a Secure Digital Memory (SD), Compact Flash (CF), Memory Stick, Universal Adapter, and the like. Furthermore, in one embodiment, handheld computing device 110 will only operate with input device 120 communicatively coupled therewith. In another embodiment, handheld computing device 110 will operate without input device 120 communicatively coupled therewith. As illustrated in FIGS. 1,2,4,5 and 6, expansion slot 150 may be disposed on the bottom of handheld computing device (e.g., 110, 210. 410, 510, and 610) such that input device (e.g., 120, 220, 420, 520, and 620) may be communicatively coupled with each handheld computing device in a portrait format (with respect to display 105).

In another embodiment (e.g., FIG. 3), expansion slot 150 may be disposed on the side of handheld computing device 310 such that input device 320 may be communicatively coupled with handheld computing device 310 in a landscape format (with respect to display 105). It is appreciated that each of the illustrated Figures may be configured in either landscape or portrait format, the present embodiments are shown in one state or the other merely for purposes of brevity and clarity.

The following is a detailed description of the use and operation of the present handheld computing assembly. With reference still to FIG. 1, input device 120 is removably coupled with handheld computing device 110. In other embodiments (e.g., FIGS. 2 through 6), the input device may be fixedly coupled with the handheld computing device. Therefore, it is appreciated that accessing the second input side on the input device may be accomplished by rotating, unfolding, opening, or otherwise manipulating the input device.

In general, the input device is utilized to extend data input capabilities while reducing both the number of accessories required, and the overall size of the handheld computer assembly. That is, by integrating the input device (e.g., keyboard, joystick, thumb keyboard, and the like) with the handheld computer, a large factor of space savings and convenience may be realized.

With reference again to FIG. 1, input device 120 is removably coupleable with handheld computing device 110. Furthermore, if the opposite side of input device 120 is desired (e.g., app/nav portion 140 instead of keypad portion 130), input device 120 may be manually removed from handheld computing device 110, rotated 180 degrees and recoupled with handheld computing device 110. These functions may be performed by the user.

Figure 2:
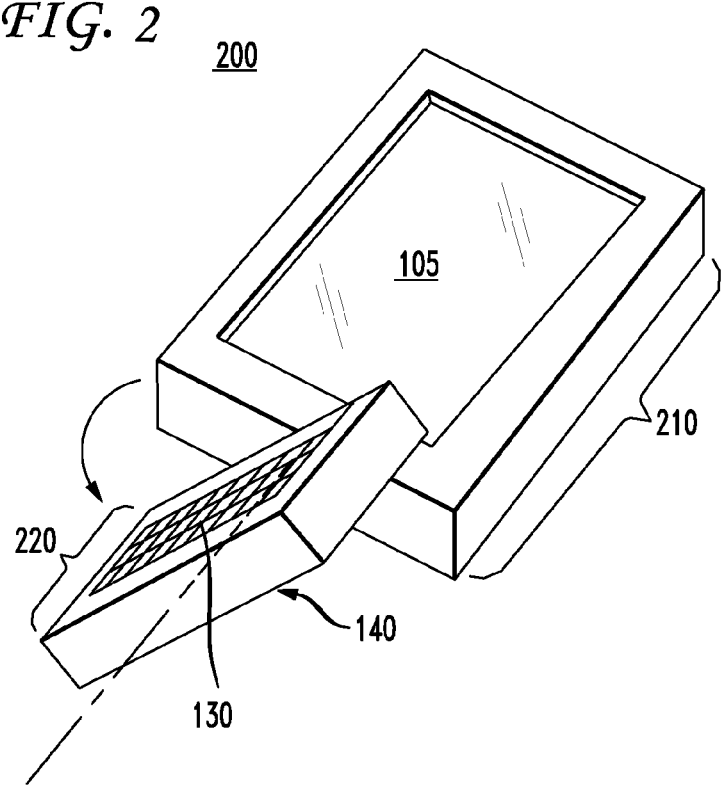
FIG. 2 is perspective view of another embodiment of a handheld computer assembly having a rotatable input device in accordance with the present claimed invention.

With reference now to FIG. 2, in one embodiment, input device 220 may be fixedly coupled with handheld computing device 210. That is, input device 220 may not be separable from handheld computing device 210, but may rotate about its axis while remaining fixedly coupled with handheld computing device 210. For example, if the opposite side of input device 220 is desired (e.g., app/nav portion 140 instead of keypad portion 130), input device 220 may be manually rotated 180 degrees with respect to handheld computing device 210. As described above, a keyboard may be placed on one side and an application/navigation tool may be implemented on the reverse side. In another embodiment, a joystick may be placed on one side and a keyboard may be implemented on the reverse side. In yet another embodiment, an English language keyboard set-up may be placed on one side and a second language keyboard set-up may be implemented on the reverse side. Therefore, it is appreciated that any one of the possible input capabilities described herein may be utilized in combination with any other of the input capabilities on the input device.

Furthermore, it is appreciated that some of the input devices are removable and that a second input device having a different configuration of input capabilities may be "switched-in" or "switched-out" depending on the users specific needs. For example, a user may primarily utilize a keyboard and application/navigation set-up for the primary input device. However, when a game is about to be played on the handheld computing system the primary input device may be removed, and an input device having a joystick may be attached.

Figure 3:
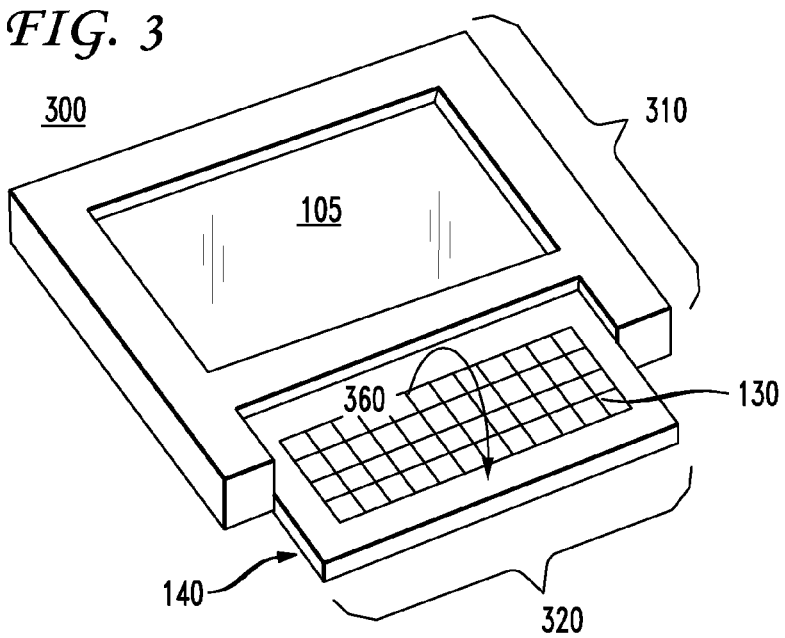
FIG. 3 is perspective view of another embodiment of a handheld computer assembly having an input device that may be rotated/flipped in a landscape orientation with a display screen in accordance with the present claimed invention.

Referring now to FIG. 3, in one embodiment, input device 320 may be fixedly coupled with handheld computing device 310. That is, input device 320 may not be separable from handheld computing device 310, but may be folded out in order to access the second input side while remaining fixedly coupled with handheld computing device 320. For example, in the closed position, app/nav portion 140 may be the operational input side. However, if the opposite side of input device 320 is desired (e.g., keypad portion 130 instead of app/nav portion 140), input device 320 may be folded out (e.g., rotated approximately 180 degrees) with respect to handheld computing device 310. Although in FIG. 3 the keys are shown only on the folded out portion of keypad 130, it is appreciated that additional input capabilities may be displayed within the uncovered portion 360. Those input capabilities might include extra keys, an app/nav display, a virtual screen, or the like.

Figure 4:
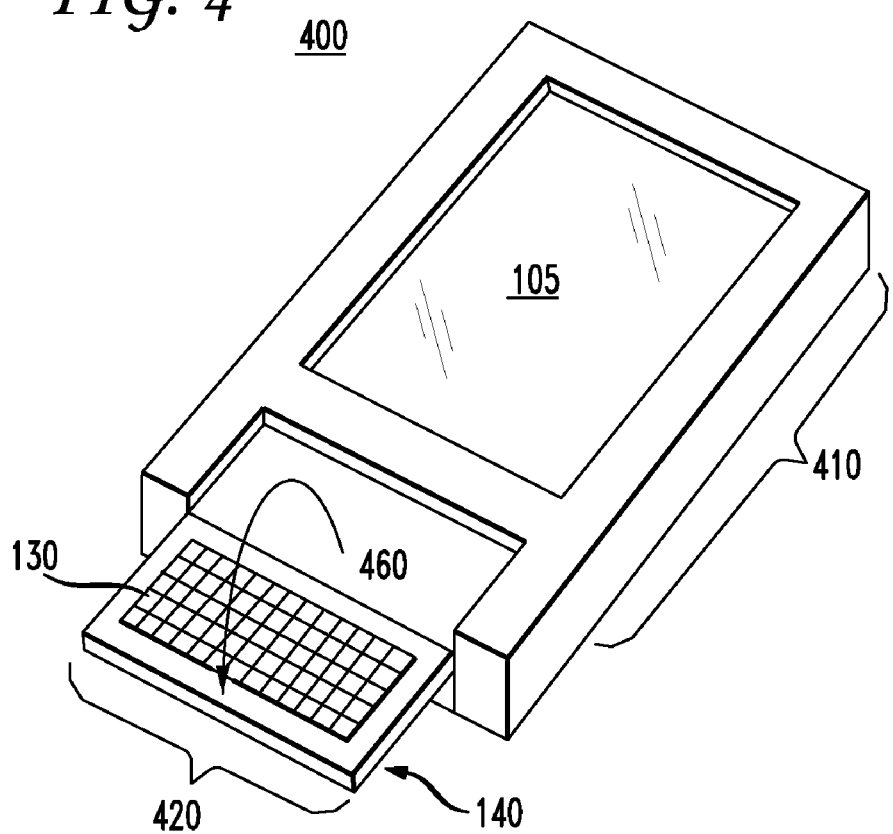
FIG. 4 is perspective view of another embodiment of a handheld computer assembly having an input device that may be rotated/flipped in a portrait orientation with a display screen in accordance with the present claimed invention.
Figure 5:
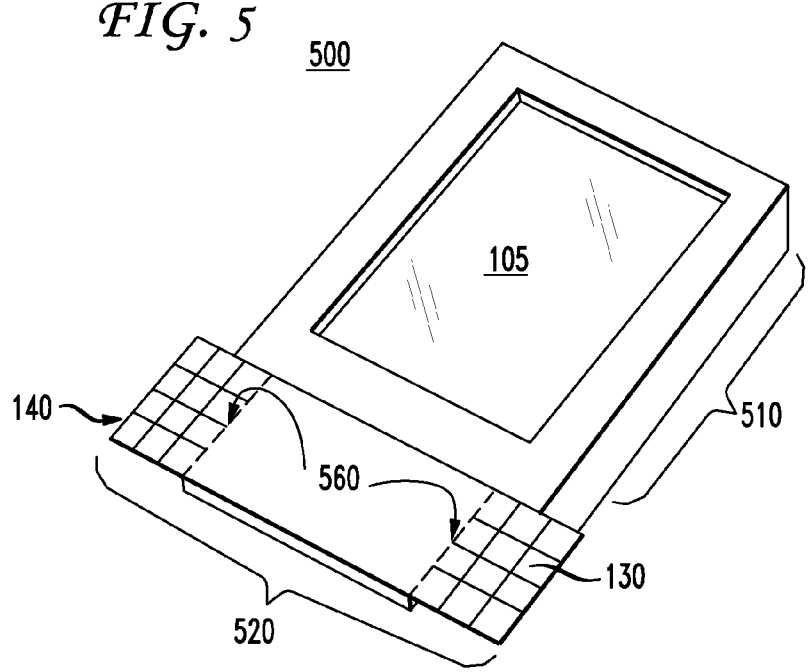
FIG. 5 is perspective view of another embodiment of a handheld computer assembly having an input device that may be opened in a manner similar to a set of shutters in accordance with the present claimed invention.

FIG. 4 and FIG. 5 are similar in function to that of FIG. 3. With reference to FIG. 4, input device 420 is in the portrait format instead of the landscape format as shown in FIG. 3. With reference to FIG. 5, instead of the input device folding out as one solid piece, input device 520 folds out into two pieces in a similar fashion as that of opening the shutters on a window. Although in FIG. 5 the keys are shown only on the folded out portion of keypad 130, it is appreciated that additional input capabilities may be displayed within the uncovered portion 560. Those input capabilities may include extra keys, an app/nav display, a virtual screen, a handwriting recognition display, or the like.

Figure 6:
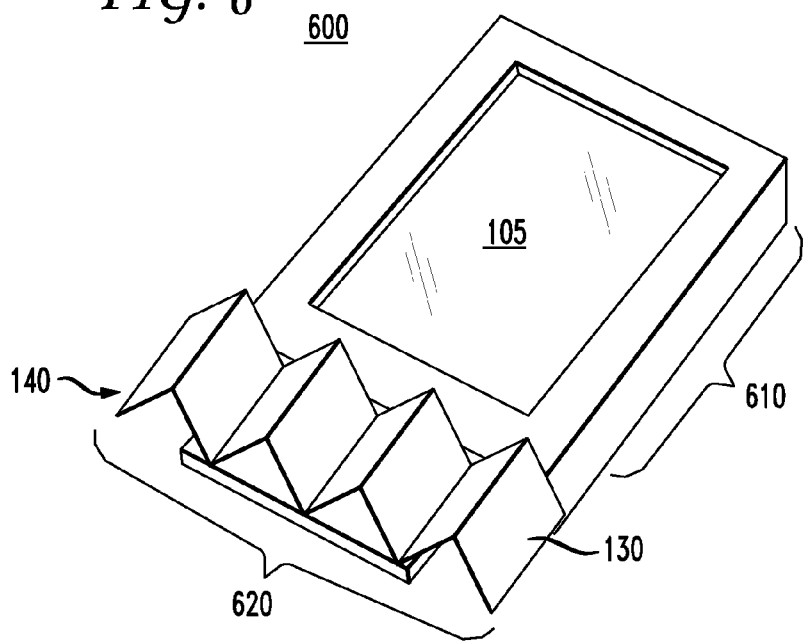
FIG. 6 is perspective view of another embodiment of a handheld computer assembly having an input device which may be opened in an accordion type manner in accordance with the present claimed invention.

Referring now to FIG. 6, in one embodiment, input device 620 may be fixedly coupled with handheld computing device 610. That is, input device 620 may not be separable from handheld computing device 610, but may be folded out (similar to an accordion type of fold) in order to access the second input side while remaining fixedly coupled with handheld computing device 620. For example, in the closed position, app/nav portion 140 may be the operational input side. However, if the fully extended portion of input device 620 is desired (e.g., keypad portion 130 instead of app/nav portion 140), input device 620 may be folded out with respect to handheld computing device 610. Although in FIG. 6 the keys are stated as being on the folded out portion of input device 620, it is appreciated that other input capabilities such as a virtual screen, or the like may be displayed on the folded out portion of input device 620.

Figure 7:
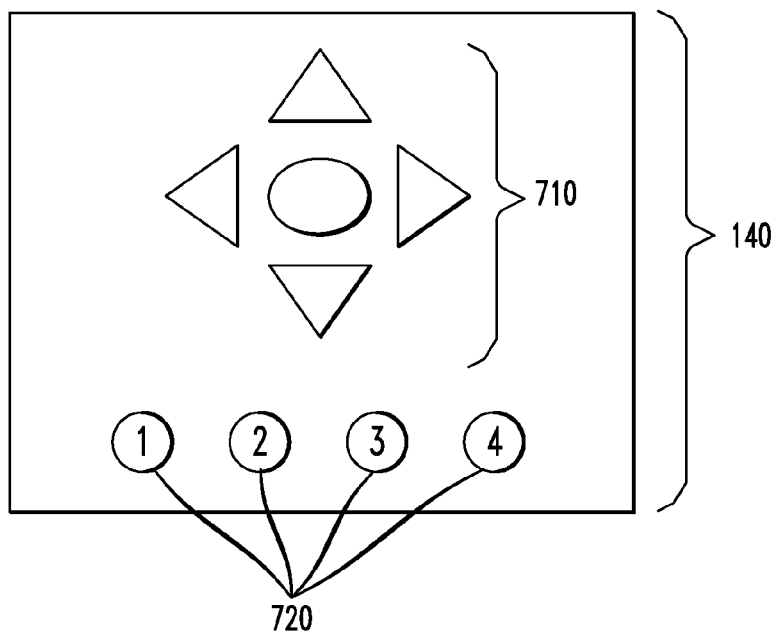
FIG. 7 is a top view of one embodiment of an exemplary application/navigation portion of an input device in accordance with the present claimed invention.

With reference now to FIG. 7, one embodiment of an application/navigation portion 140 is shown. Included in app/nav portion 140 are cursor controls 710 which include directional arrows and an enter portion. App/nav portion 140 may also include application (e.g., selection, hot keys, etc.) buttons such as application buttons 720. Although four application buttons 720 are shown, an app/nav portion 140 may include any number of application buttons. Furthermore, it is appreciated that app/nav portion 140 may be comprised of only one set of the input controls (e.g., either application buttons 720 or cursor controls 710) described herein.

Figure 8:
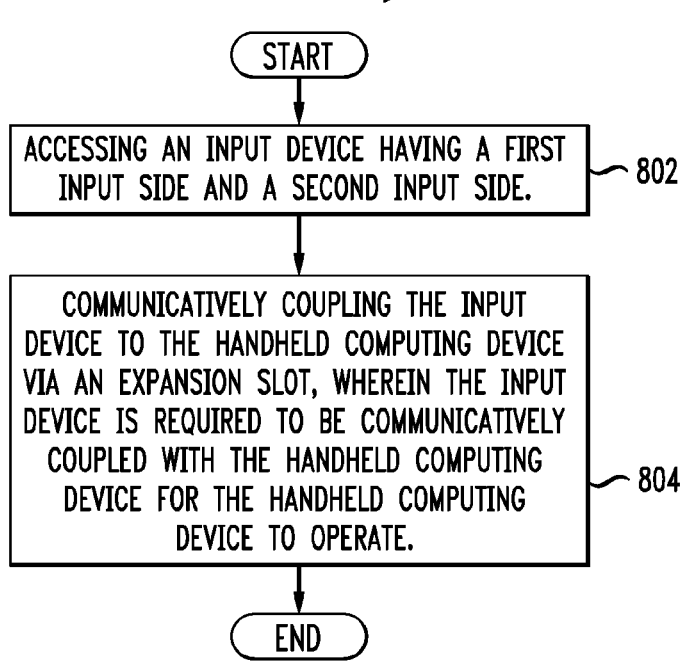
FIG. 8 is a flow chart of steps performed in accordance with one embodiment of the present claimed invention.

With reference now to FIG. 8, a flow chart 800 summarizing the steps performed in accordance with one embodiment of the present invention is shown. At step 802, the present embodiment accesses an input device having a first input side and a second input side. As described in detail herein, the input device (e.g. 120, 220, 320, 420, 520, and 620) may have a plurality of different input configurations which may be "switched-in" or "switched-out" depending on a users specific needs.

Next, at step 804, the present embodiment communicatively couples the input device to a handheld computing device via an expansion slot, wherein the input device is required to be communicatively coupled with the handheld computing device in order for the handheld computing device to operate. As described in detail herein, the input device (e.g. 120, 220, 320, 420, 520, and 620) is adapted to allow for easier input of data such that the further step of carrying or connecting a secondary input device is not required. It is also appreciated that other embodiments such as those described herein may not require the input device to be communicatively coupled with the handheld computing device in order for the handheld computing device to operate.

Thus, embodiments of the present invention provide a dual sided input device for a handheld computer method and apparatus which allows for easier data entry. The dual sided input device for a handheld computer method and apparatus achieves the above accomplishment and also provides a compact and highly portable data input method which significantly reduces component costs and requirements. In addition, it can be adapted to readily interface with industry standard expansion slots and meet industry standard specifications.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A handheld computer assembly comprising:
   a handheld computing device comprising an expansion slot; and an input device communicatively coupled with said handheld computing device, said input device utilizing said expansion slot to provide a communicatively coupled connection with said handheld computing device, said input device comprising:
   an application/navigation portion; and
   a keyboard portion
   wherein said input device is configurable to be disposed flush with said integrated display screen and wherein said input device is rotatably attached to said handheld computer device allowing said application/navigation portion and said keyboard portion to be oriented with said handheld computing device by rotation of said input device with respect to said handheld computing device and wherein said rotation is performed about a long axis of said handheld computing device and wherein said expansion slot is selected from the group consisting of Secure Digital Memory, Compact Flash, and Memory Stick.

2. A handheld computer assembly comprising:

a handheld computing device including a display screen and an expansion slot;

an input device having opposite sides with one operation portion on one side an another operating portion on the reverse side, said input device adapted to be rotatably coupled to said handheld computing device through said expansion slot whereby said input device may be rotated with reference to said handheld computing device to provide the desired side of said input device positioned with respect to said display screen.

3. A handheld computer assembly according to claim 2 wherein one of said sides of said input device comprises a keypad as an operating portion.

4. A handheld computer assembly according to claim 2 wherein one of said sides of said input device comprises an application/navigation tool as an operating portion.

5. A handheld computer assembly according to claim 2 wherein one of said sides of said input device comprises a keypad as an operation portion and said reverse side comprises an application/navigation tool as an operating portion.

6. A handheld assembly according to claim 2 wherein said input device is fixed with said handheld computing device whereby the input device and the handheld computing device are not separable.

7. A handheld assembly according to claim 2 wherein said expansion slot is selected from a group consisting of Secure Digital Memory, Compact Flash, and Memory Stick.

8. A handheld assembly according to claim 2 wherein said display screen is oriented in a landscape display mode.

9. A handheld computer assembly according to claim 2 wherein said one side of said input device comprises a first language keyboard set up as an operating portion and said reverse side comprises a second language keyboard set up.

10. A handheld computer assembly according to claim 2 wherein said input device is configurable to be disposed flush with said display screen.

* * * * *